United States Patent [19]
Nakayama et al.

[11] Patent Number: 5,393,429
[45] Date of Patent: Feb. 28, 1995

[54] LIQUID-LIQUID CONTACTOR

[75] Inventors: Takashi Nakayama, Handa; Hiroshi Umino, Yokohama; Yasuyuki Sakakura; Kiyoshi Takahashi, both of Yokkaichi, all of Japan

[73] Assignees: JGC Corporation; Mitsubishi Petrochemical Co., Ltd., both of Tokyo, Japan

[21] Appl. No.: 970,132

[22] Filed: Nov. 2, 1992

[30] Foreign Application Priority Data

Nov. 5, 1991 [JP] Japan .................. 3-288554
Sep. 22, 1992 [JP] Japan .................. 4-253036

[51] Int. Cl.$^6$ .............................. B01D 11/00
[52] U.S. Cl. .................... 210/634; 210/320; 210/521; 210/522; 210/513; 210/DIG. 5; 422/256; 55/444
[58] Field of Search .......... 210/799, DIG. 5, 538, 210/801, 285, 320, 498, 521, 634, 522, 513; 55/444; 422/255, 256

[56] References Cited

U.S. PATENT DOCUMENTS

| | | |
|---|---|---|
| 3,521,756 | 7/1970 | Kaminsky ............... 210/521 |
| 3,658,484 | 4/1972 | Bright .................. 55/444 |
| 3,826,740 | 7/1974 | Sewett ................. 210/521 |
| 3,878,094 | 4/1975 | Conley et al. ......... 210/DIG. 5 |
| 4,275,032 | 6/1981 | Anderson .............. 210/521 |
| 4,305,907 | 12/1981 | Baird ................. 210/521 |
| 4,982,653 | 1/1990 | Latge ................. 210/521 |
| 5,194,152 | 3/1993 | Takács et al. ......... 210/634 |

Primary Examiner—Robert A. Dawson
Assistant Examiner—Ana M. Fortuna
Attorney, Agent, or Firm—Armstrong, Westerman, Hattori, McLeland & Naughton

[57] ABSTRACT

In a non-agitational, countercurrent flow type of liquid-liquid contacting tower, splitter plates with plural slits and/or holes through which light and heavy liquids flow, and baffles having the appropriate shapes and areas in order to cover the liquid flowing upward or downward, are alternately mounted horizontally inside the tower shell in vertical direction. The ratios of the opening area to the total cross-sectional area in the splitter plate are 10% to 40%, and the opening area of a baffles is larger than the aperture area of a splitter plate. The advantages of this invention are as follows: Because of the high contacting efficiency, a relatively smaller contactor has an equivalent performance with that of a larger contactor; there exists no risk of plugging due to scum accumulation, and maintenance is easy.

12 Claims, 6 Drawing Sheets

LIQUID-LIQUID CONTACTOR

BACKGROUND OF THE INVENTION

1. Field of Invention

The present invention concerns improvement in liquid-liquid contactor in which two liquids are continuously contacted in counter current flow due to the density difference between the two liquids. A liquid-liquid contacting operation is one of important separation operations, and is widely used for liquid-liquid extraction, indispensable in the petroleum refinery, petrochemistry, coal chemistry, nuclear energy processing, and many other processing industries.

2. State of the Art

A variety of types of liquid-liquid contactors has been developed. Industrial contactors are consisted of two types : one is unagitated type such as perforated-plate towers, packing towers, and baffle towers; second is mechanically agited or pulsed type, such as rotary disk towers, Oldshue-Rushton towers, pulsed towers and reciprocating-plate towers.

Performances required for a liquid-liquid contactor are: (1) high throughput, (2) free from scum accumulation, (3) easy maintenance, and (4) high extraction efficiency when used for extraction.

Conventional contactors have the following disadvantages: with respect to perforated-plates, towers and packing towers used for liquid-liquid systems in which scums are produced, the towers are likely to cause plugging. Baffle towers such as disk-and-doughnut type, side-to-side type and center-to-side type have large cross-sectional areas for liquid to flow fast. Therefore, scum hardly accumulates, however, extraction efficiency is not high. Rotating disk contactors and other mechanically agitated or pulsed contactors exhibit relatively high extraction efficiencies, and are free of plugging. However, investment and maintenance costs are relatively high.

SUMMARY OF THE INVENTION

The objective of the present invention is to develop a non-agitated type liquid-liquid contactor with lower investment and easy maintenance, which exhibits high extraction efficiency, and prevents scum accumulation.

DETAILED EXPLANATION OF THE PREFERRED EMBODIMENTS

Figure 1:
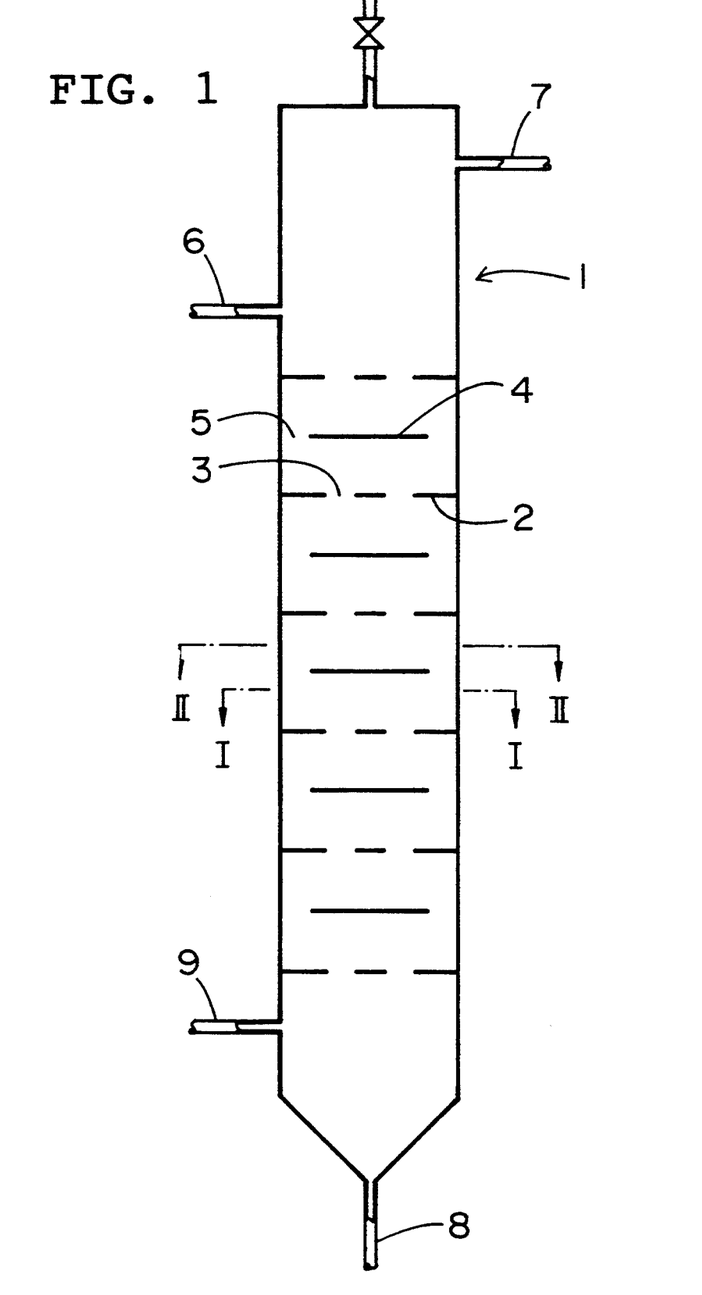
FIG. 1 shows the vertical cross-sectional view of the major portion of the invented contactor.
Figure 2:
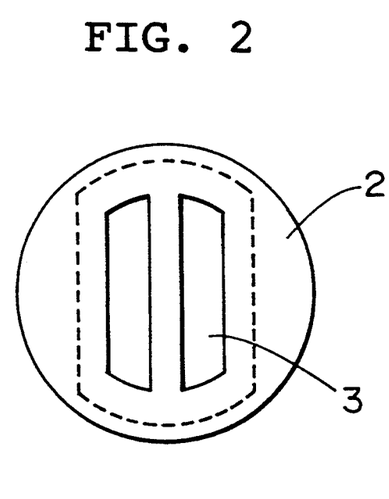
FIG. 2 shows the cross-sectional view of the invented contactor in I—I direction of FIG. 1.
Figure 3:
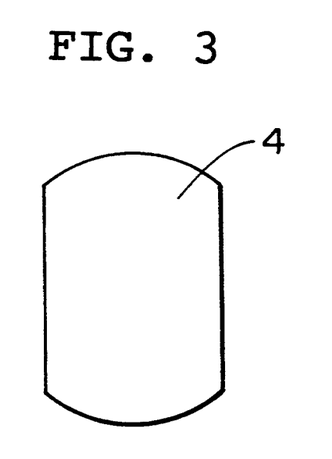
FIG. 3 shows the cross-sectional view of the invented contactor in II—II direction of FIG. 1.
Figure 4A:
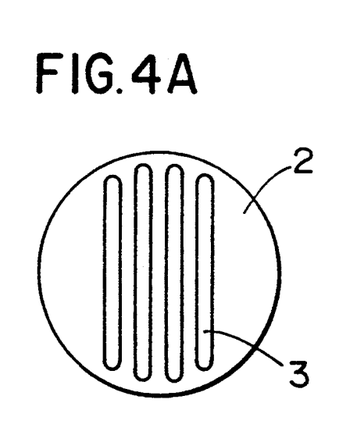
FIG. 4 shows the plan view of an example of a splitter plate and a baffle used in the invented contactor.
Figure 4B:
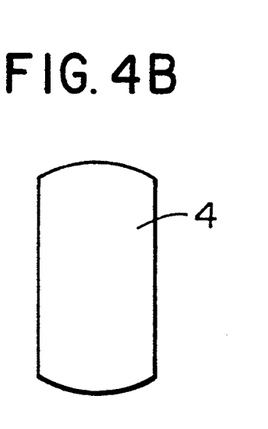
Figure 5A:
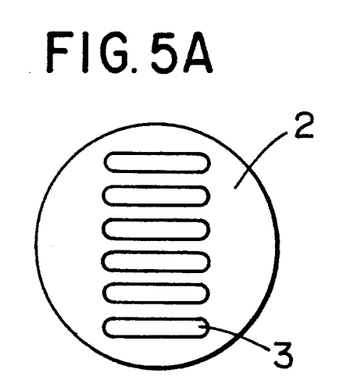
FIGS. 5 to 9 are figures similar to FIG. 4.
Figure 5B:
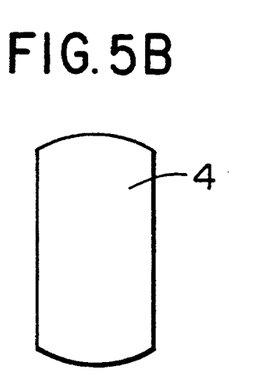
Figure 6A:
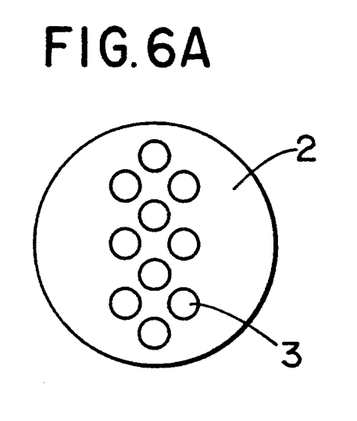
Figure 6B:
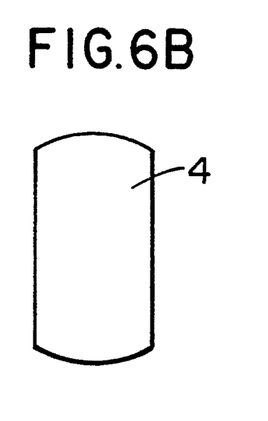
Figure 7A:
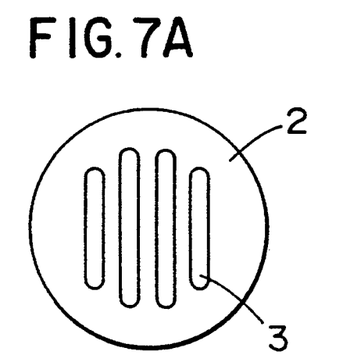
Figure 7B:
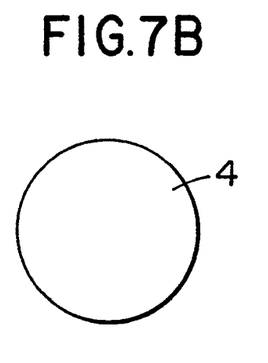
Figure 8A:
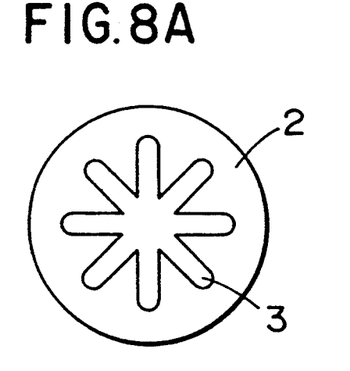
Figure 8B:
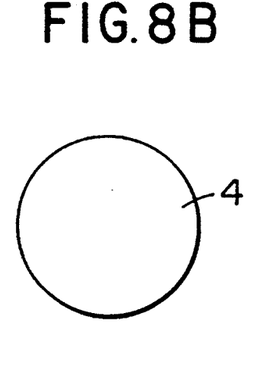
Figure 9A:
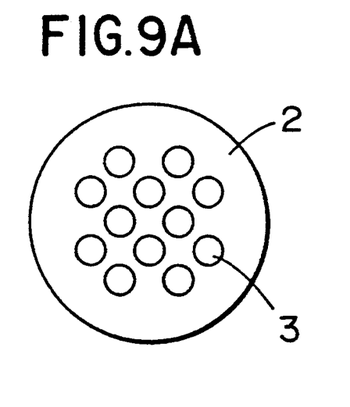
Figure 9B:
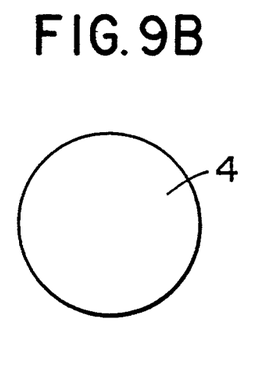

The apparatus of the present invention is a liquid-liquid contactor shown in FIGS. 1 to 3 in which a heavy liquid is fed from the top of the contactor (1) and a light liquid is fed from the bottom of the contactor so as to contact in continuous counter flow. One of the two liquids forms a dispersed phase and the other forms a continuous phase. The contactor comprises of a tower shell with splitter plates (2) and baffles (4). The splitter plates extending horizontally in the shell have plural slits and/or holes (3) through which the dispersed and continuous phases flow. The baffles inserted between splitter plates extend horizontally over the splitter plates to cover the liquid flow paths in the splitter plates, and provide the liquid flow paths (5).

The aperture ratio of the baffles is larger than that of a splitter plate. The important function of the splitter plates is that the residence time of the droplets of the dispersed phase is long enough to form coalesced layers under the splitter plates.

In FIG. 1, (6) denotes the inlet of a heavy liquid, (7) denotes the outlet of a light liquid, (8) denotes the outlet of a heavy liquid, and (9) denotes the inlet of a light liquid.

Many other different shapes of splitter plates and baffles besides the examples shown in FIGS. 2 and 3, are possible. Some of those examples are shown in FIGS. 4 to 9 where splitter plates and baffles are shown in the left-hand sides, and right-hand sides, respectively.

The sizes of the aperture for liquid flow depend on the total capacity of the tower, the density difference between the liquids, and liquid viscosities, etc. When the shape is slit, the appropriate width ranges from 10 mm to 30 mm. With respect to circular holes, appropriate diameters are 10 mm to 150 mm, especially desirable diameters are 15 to 30 mm.

It is a matter of course that not only the circle holes but also triangles, squares, and star-shape and other arbitrary shapes can be chosen.

In all the cases mentioned above, the ratio of the cross-sectional area of the open channels of a splitter plate to that of the total tower cross-sectional area ranges from 10 to 40%. The desirable percentages are 20%–35%. The figure illustrated by broken lines shown in FIG. 2 indicates a projection of the baffle (FIG. 3) located just over the splitter plate.

The distance between the splitter plates and the baffles is, determined depending on tower sizes, and properties of the liquids to be contacted to reduce the extent of axial mixing. Usually, the desirable distance ranges from 30 mm to 500 mm, and the preferable range is 50 mm to 200 mm.

Some of the operating conditions of this liquid-liquid contactor are determined by considering density difference and viscosities of the liquids. As one of important operating conditions, total superficial velocity of a feed: sum of the velocities of the light and heavy liquids, ranges from 0.2 cm/sec to 2 cm/sec.

Light and heavy liquids to be contacted in the present liquid-liquid contactor may be any combination of two liquids which have low mutual solubilities, and are readily separable. Preferable examples of light and heavy liquids are given below:

A suitable light liquid is selected among acetic acid esters, acrylic acid esters, and methacrylic acid esters. Generally, these esters are produced from esterification reactions, or ester-exchange reactions of alkyl alcohols of 1–10 carbon atoms and one of acetic acid, acrylic acid, and methacrylic acid. The examples of such esters are ethyl acetate, butyl acetate, isobutyl acetate, amyl acetate, methyl acrylate, ethyl acrylate, butyl acrylate, 2-ethylhexyl acrylate, octyl acrylate, nonyl acrylate, butyl methacrylate, 2-ethylhexyl methacrylate, and so on.

Synthesis of esters such as acetates, acrylates, and methacrylates is carried out by reacting a corresponding acid like acetic acid, acrylic acid, and methacrylic acid with an alcohol by using sulfuric acid, or para-toluene sulfonic acid, or methane sulfonic acid as a catalyst. Suitable light liquids to be used in the present invention are mainly esters as noted above, and might include (1) raw materials used during a course of ester production: alcohols, acetic acid, acrylic acid, and methacrylic acid; (2) catalyst, and (3) by-products of esterification. Furthermore, product mixtures coming out of an esterification reactor could be treated as light liquids.

A suitable heavy liquid is chosen from an aqueous solution containing at least one of acetic acid, acrylic acid and methacrylic acid; an aqueous alkaline solution containing, for instance, caustic soda; and water itself.

Figure 10:
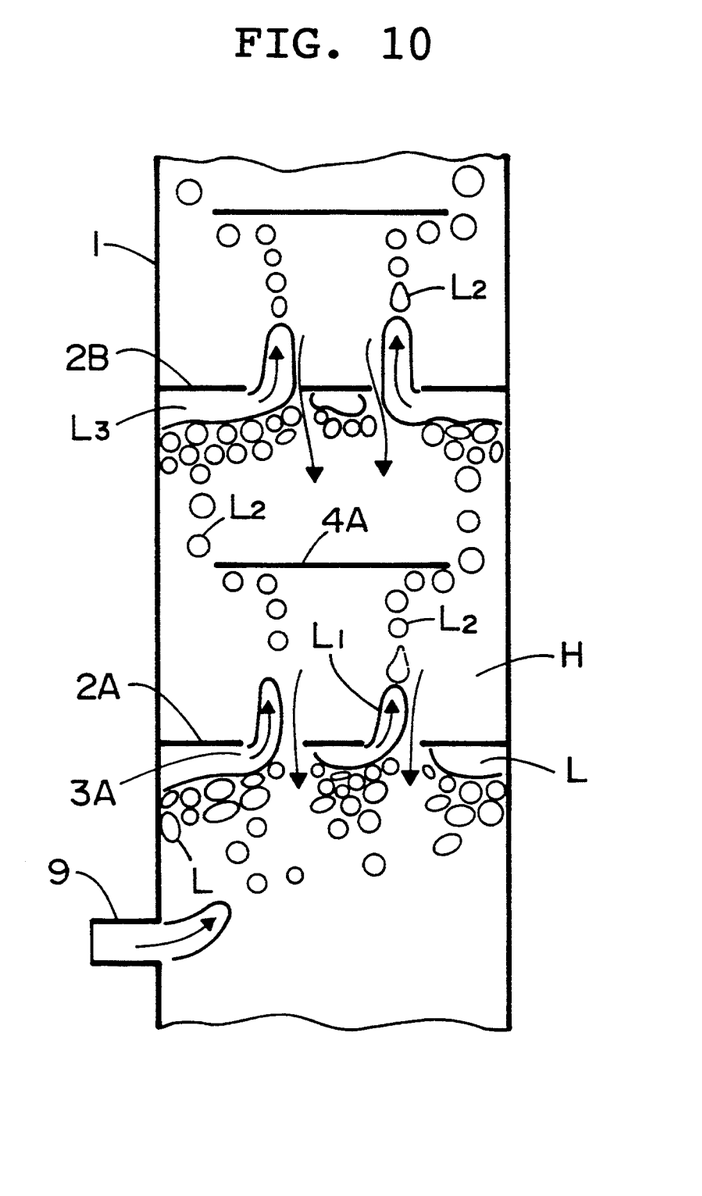
FIG. 10 shows the enlarged vertical sectional view of the major part of the invented contactor aiming at explaining flow droplets.

In a case where a light liquid is a dispersed phase, a light liquid(L) contacts a heavy liquid(H) in this liquid-liquid contactor in a manner illustrated in FIG. 10.

Namely, the light liquid(L) introduced into the tower (1) through the light liquid inlet (9), is splitted into many streams by the apertures for liquid flow (3A) in the lower splitter plate (2A), and rises through the heavy liquid(H) as liquid jets. In the course of rising in apertures (3A), the liquid jets of light liquid are broken up into small spherical droplets (L2). The droplets reach the baffle plate (4A), and flow radially along the lower surface of the baffle, then rise upward through the open channels of the baffle as droplets (L2). The droplets coalesce while moving slowly along the under surface of the second splitter plate (2B) to form coalesced layers (L3). The light liquid flows upward again through the next splitter plate as liquid jets, and the liquid jets are broken up into small droplets (L2). These processes are repeated.

Figure 11:
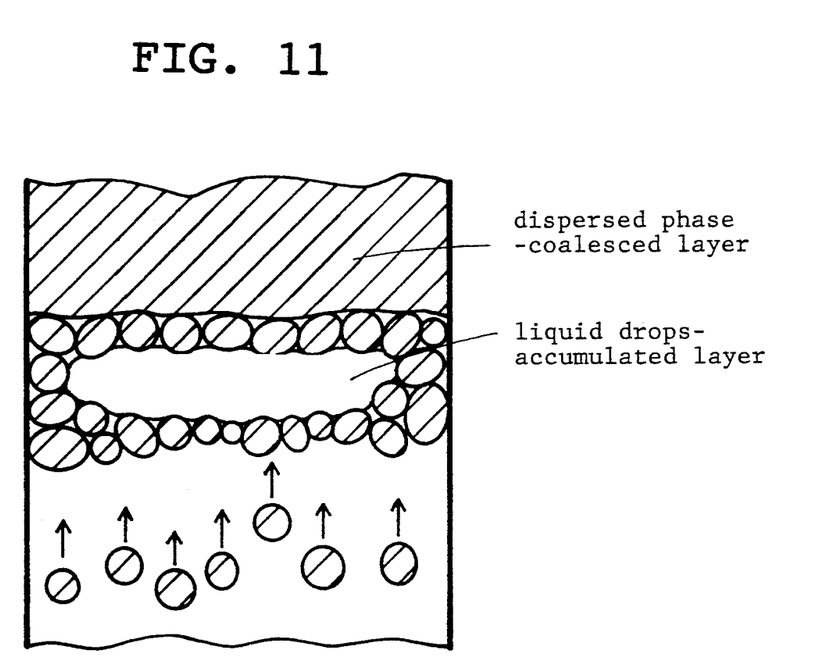
FIG. 11 shows the mechanism of formation of coalesced droplet layers in the invented contactor.

FIG. 11 schematically illustrates a manner of formation of coalesced layers (L3) from the droplets (L2) under the splitter plate (2B). Droplets (L2) gather and accumulate to form layers of droplets accelerated by mutual contacting of droplets, and form coalesced layers (L3).

Due to a formation of liquid jets through a splitter plate and breakup of the jets into droplets, surfaces of the light liquid phase are renewed, and extraction proceeds through contacting with the heavy liquid. Due to the subsequent formation of coalesced layers, the concentration of the specific components in the droplets become uniform. Repetition of these processes leads to higher extraction efficiency in the invented contactor.

The liquid-liquid contactor of the present invention provides a high liquid-liquid contacting efficiency because of frequent coalescence and breakup of dispersed phase droplets. Since droplets passing through the apertures of the splitter plate become larger than those by the conventional contactors, high liquid flow rates can be attained, thus the present apparatus can produce higher throughputs.

Formation of coalesced layers of dispersed phase droplets at each splitter plate reduces axial mixing of the dispersed and continuous phases, and extraction efficiency does not decrease with scale-up of the apparatus.

Since scum hardly accumulates in the present apparatus, it is free from plugging. Maintenance is easy because the present apparatus has no mechanically agitated parts.

In a case where a heavy liquid is a dispersed phase, the characteristics of the present invention is also retained except that the dispersed phase flows downward.

The present invention would be described in detail in some examples. In the following Comparative Examples 1 and 2, and Example 1, extraction of acetic acid was carried out from the waste aqueous solution containing 34% (by weight) of acetic acid (hereinafter referred to as "feedstock") using ethyl acetate (hereinafter referred to as "solvent").

COMPARATIVE EXAMPLE 1

As the apparatus for extraction, a perforated plate tower made of glass of inner diameter of 100 mm, was used. Each five perforated plates having four holes of 6 mm diameter, is mounted inside the tower at intervals of 150 mm. The feedstock is a heavy liquid and the solvent is a light liquid. The latter was fed as the dispersed phase, and was contacted with the former at a solvent ratio (solvent/feedstock) of 1.8/1.0 by weight, at 30° C. under atmospheric pressure.

At the flow rates of the feedstock, 45 kg/Hr and of the solvent 81 kg/Hr, the flow rate of the raffinate was 33.8 kg/Hr, with acetic acid concentration of 17.5% and water concentration of 72.9%. When the flow rate of the feedstock was increased to 56 kg/Hr, and 101 kg/Hr for the solvent, flooding occurred.

Then, the number of holes (diameter 6 mm) of the perforated plates was increased from four to eight, and the extraction was repeated. At the flow rates of the feedstock 45 kg/Hr and the solvent 81 kg/Hr, the flow rate of the raffinate was 34.6 kg/Hr, with acetic acid concentration of 19.5% and water concentration of 71.0%. When the flow rate of the feedstock was increased to 56 kg/Hr, and 101 kg/Hr for the solvent, flooding also occurred.

Liquid-liquid equilibrium calculation was made to determine the average stage efficiency. The obtained values are listed in TABLE 1 as well as the extraction factors. Where, Average stage efficiency =

$$\frac{\text{Caluculated number of theoretical stage}}{\text{Number of stage of the apparatus}} \times 100\ (\%)$$

Extraction factor =

$$\frac{\text{Quantity of acetic acid in solvent}}{\text{Quantity of acetic acid in feedstock}} \times 100\ (\%)$$

As a result of continuous operation using the perforated-plates having four holes, or eight holes at the flow rates of 45 kg/Hr for the feedstock, and 81 kg/Hr for the solvent, scum gradually accumulated, and after 30 hours continuous operation became difficult in both cases.

TABLE 1

| Flow Rate; kg/Hr (superficial velocity; cm/sec.) | | Four Holes | | Eight Holes | |
|---|---|---|---|---|---|
| | | Extraction Factor | Stage Efficiency | Extraction Factor | Stage Efficiency |
| Feedstock | Solvent | (%) | (%) | (%) | (%) |
| 45 (0.16) | 81 (0.32) | 61 | 14 | 56 | 12 |
| 56 (0.20) | 101 (0.40) | flooding occurred | | flooding occurred | |

COMPARATIVE EXAMPLE 2

As an extraction apparatus, a disk-and-doughnut type baffle tower was used. The inner diameter of the tower is 100 mm. Outer diameter of the disk is 80 mm and inner diameter of the doughnut is 70 mm. The intervals between the disks and doughnuts are 75 mm, and the pitches of the disks are 150 mm. The number of stages is five: one stage consists of a pair of a disk and a doughnut. Even at the flooding flow rates for the perforated-plate towers mentioned above: 56 kg/Hr feedstock, and 101 kg/Hr solvent, extraction could be carried out in this apparatus. However, the raffinate flow rate was 45.4 kg/Hr with acetic acid concentration of 21.3%, and water concentration 68.7%, and the extraction factor and the stage efficiencies were lower than those of the perforated-plate tower as shown in TABLE 2. When the flow rates of the feedstock and the solvent were increased to 81 kg/Hr and 146 kg/Hr, respectively, flooding occurred.

TABLE 2

| Flow Rates; kg/Hr (space velocity; cm/sec.) | | Extraction Rate | Stage Efficiency |
|---|---|---|---|
| Feedstock | Solvent | (%) | (%) |
| 56 (0.20) | 101 (0/40) | 49 | 10 |
| 81 (0.29) | 146 (0.57) | flooding occurred | |

EXAMPLE 1

An extraction apparatus having splitter plates and baffles of the shapes shown in FIG. 2 and FIG. 3, was used. The opening area for passage of the liquids in the splitter plates is 30%, and that of the baffles is 40%. The intervals between splitter plates and adjacent baffles are 75 mm, and the number of stages (a pair of a splitter plate and a baffle forms one stage) is five.

At the flow rates of 56 kg/Hr for the feedstock and 101 kg/Hr for the solvent, the raffinate flow rate was 39.8 kg/Hr with concentrations of acetic acid and water of 14.2% and 76.6%, respectively. When the flow rates of the feedstock and the solvent were increased to 81 kg/Hr and 146 kg/Hr, respectively, the raffinate contained acetic acid of 12.1% and water of 79.1%. The stage efficiencies and extraction factors are listed in TABLE 3.

Scum is formed more or less, but no accumulation was observed.

TABLE 3

| Flow Rates; kg/Hr (superficial velocity; cm/sec.) | | Extraction Rate | Stage Efficiency |
|---|---|---|---|
| Feedstock | Solvent | (%) | (%) |
| 56 (0.20) | 101 (0.40) | 64 | 15 |
| 81 (0.29) | 146 (0.57) | 66 | 16 |

It would be understood from the above data that the apparatus of the present invention enables high efficiency extraction at high flow rates.

Observation of the behavior of the liquids in extraction towers made of glass revealed the following facts: In the perforated-plate tower, dispersed phase breaks up into small droplets whose rising velocities are low. Therefore, flooding is likely to occur, and high throughput is difficult.

In a disk-and-doughnut tower, coalescence and breakup of droplets can not be achieved repeatedly.

On the other hand, in the present invention the liquid droplets coalesced under the splitter plates, ascend fast through the apertures in the form of large droplets resulting in jets breakup, and then small droplets are generated, and after colliding with the next baffle the droplets coalesce under the next splitter plate. The coalesced liquid droplet layers break up to form small droplets again, and such mechanism of coalescence and breakup mentioned above are repeated. It is considered that although large droplets are unfavorable from the view point of contact efficiency, repetition of coalescence and breakup improves the total extraction efficiency. This is the reason why the present invention is superior to the conventional extraction tower of disk-and-doughnut type described in the Comparative Example 2. Moreover, the large droplets give higher superficial velocities of both dispersed and continuous phase. Coalesced layers are formed due to coalescence of the droplets under the splitter plates, and in addition, both the dispersed and the continuous phases flow in plug flow. Therefore, even at a larger scale tower, it is possible to reduce axial mixing, and thereby, the contact efficiency can be maintained high. In other words, performance dependency on scale is weak concerning the present apparatus.

EXAMPLE 2

Butyl methacrylate was prepared by reacting methacrylic acid and n-butyl alcohol. Butyl alcohol and methacrylic acid were mixed at the ratio of 1.2 (mole), and para-toluene sulfonic acid was added to be 0.75% (by weight) to the mixture as esterification catalyst. The mixture was charged into the reactor, and heated by steam. The reaction temperature was kept at 100° C. by adjusting the pressure in the reactor. Heating was continued until the reaction was completed by distilling all the water formed by the reaction.

The product was discharged from the reactor, and analyzed by a gas chromatography. Compositions (by weight) of the product were: butyl methacrylate 89.5%, butyl alcohol 9.9%, and methacrylic acid 0.5%. The conversion of the methacrylic acid was 99%. Analysis by a liquid chromatography gave the content of para-toluene sulfonic acid of 0.82%.

Extraction of para-toluene sulfonic acid was conducted by liquid-liquid contacting using the reaction product as the light liquid(feedstock), and water as the heavy liquid (solvent). The flow rates were 183 kg/Hr for the light liquid, and 54 kg/Hr for water.

Concentration of the para-toluene sulfonic acid after the extraction remaining in the light liquid, was 0.15%, and the extraction factor was 82%. Liquid-liquid equilibrium calculation gave the stage efficiency of 23%. The efficiency did not decrease even after long periods of operation.

COMPARATIVE EXAMPLES 3 AND 4

Extraction was conducted on the same combination of the light and heavy liquids as in Example 2, using the lo perforated-plate tower (Comparative Example 3), or the baffle tower (Comparative Example 4). The results are shown in TABLE 4 along with the data of Example 2.

TABLE 4

| Feeding Rates; kg/Hr (superficial velocity cm/sec.) | | Extraction Factor (%) | Stage Efficiency (%) |
| --- | --- | --- | --- |
| | Feedstock. | Solvent. | |
| Example 2 | 183 (0.74) | 54 (0.19) | 82 | 23 |
| Comparative Example 3 | 100 (0.41) | 23 (0.08) | 71 | 20* |
| Comparative Example 4 | 98 (0.40) | 29 (0.10) | 61 | 17 |
| | 164 (0.67) | 49 (0.17) | flooding occurred | |

*After a continuous operation for 31 hours scum accumulated, and continuous operation became difficult.

We claim:

1. A liquid-liquid contactor comprising:
a vertically disposed tower shell;
an inlet for feeding heavy liquid located at an upper position of the tower shell;
an inlet for feeding light liquid located at a lower position of the tower shell, one of the two liquids forms a dispersed phase, and the other liquid forms a continuous phase in continuous countercurrent flow in the contactor;
an outlet for removing heavy liquid located at a lower portion of the tower shell;
an outlet for removing light liquid located at an upper portion of the tower shell;
splitter plates and baffles mounted alternately in an axial direction at appropriate intervals inside the tower shell; each splitter plate having apertures of at least one of plural slits and plural holes through which both heavy and light liquids flow; the area of apertures of one baffle being larger than that of the splitter plate underlying the baffle, which extends in a manner of covering the underlying apertures of the splitter plate, and provides flow channels for liquids flowing through the splitter plate; the residence time of the dispersed phase liquid moving under the splitter plate being long enough to form coalesced layers of droplets.

2. A liquid-liquid contactor according to claim 1, wherein the slits of the splitter plates have a width of 5 mm to 150 mm.

3. A liquid-liquid contactor according to claim 1, wherein the ratios of the aperture area of a splitter plate to the total tower cross-sectional area are from 10% to 40%.

4. A liquid-liquid contactor according to claim 1, wherein the distance between the splitter plates and the baffles is from 30 mm to 500 mm.

5. A method of liquid-liquid contacting by using a liquid-liquid contactor comprising:
a vertically disposed tower shell;
an inlet for feeding heavy liquid located at lower position of the tower shell;
an inlet for feeding light liquid located a lower position of the tower shell, one of the two liquids forms a dispersed phase, and the other liquid forms a continuous phase in continuous countercurrent flow in the contactor;
an outlet for removing heavy liquid located at a lower portion of the tower shell;
an outlet for removing light liquid located at an upper portion of the tower shell;
splitter plates and baffles mounted alternatively in an axial direction at appropriate intervals inside the tower shell; each splitter plate having apertures of at least one of plural slits and plural holes through which both heavy and light liquids flow; the area of apertures of one baffle being larger than that of the splitter plate underlying the baffle, which extends in a manner of covering the underlying apertures of the splitter plate, and provides flow channels for liquids flowing through the splitter plate; the residence time of the dispersed phase liquid moving under the splitter plate being long enough to form coalesced layers of droplets, comprising carrying out liquid-liquid contacting operation by feeding a heavy liquid and a light liquid through said representative inlets under condition that the total supercritical velocity defined by the sum of the superficial velocities of heavy and light liquids, ranges from 0.2 cm/sec to 2 cm/sec.

6. A method of liquid-liquid contacting according to claim 5, wherein a light liquid is ester-based, selected from the group consisting of acetic acid esters, acrylic acid esters, and methacrylic acid esters; the heavy liquid is an aqueous solution containing at least one acid selected from the group consisting of acetic acid, acrylic acid, and methacrylic acid, aqueous alkaline solution, and water.

7. A liquid-liquid contactor according to claim 1, wherein the slits of the splitter plates have a width of from 10 mm to 30 mm.

8. A liquid-liquid contactor according to claim 1, wherein the slits of the splitter plates are hole apertures having diameters of from 10 mm to 150 mm.

9. A liquid-liquid contactor according to claim 1, wherein the slits of the splitter plates are hole apertures having diameters of from 15 to 30 mm.

10. A liquid-liquid contactor according to claim 1, wherein the ratios of the aperture area of a splitter plate to the total tower cross-sectional area are from 20% to 35%.

11. A liquid-liquid contactor according to claim 1, wherein the distance between the splitter plates and the baffles is from 50 mm to 200 mm.

12. A liquid-liquid contactor according to claim 1, wherein the outlet for heavy liquid is located at the bottom of the tower shell, and the outlet for light liquid is located at the top of the tower shell.

* * * * *